(12) United States Patent
Robichaux et al.

(10) Patent No.: US 7,249,632 B2
(45) Date of Patent: *Jul. 31, 2007

(54) TOP DRIVE SWIVEL APPARATUS AND METHOD

(75) Inventors: Kip M. Robichaux, Houma, LA (US); Terry P. Robichaux, Houma, LA (US); Steve Jacobs, Houma, LA (US); Bryan Clement, Houma, LA (US); Murray Pellegrin, Houma, LA (US); Kenneth G. Caillouet, Thibodaux, LA (US); Philip K. Watson, Houma, LA (US)

(73) Assignee: Mako Rentals, Inc., Houma, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/371,168

(22) Filed: Mar. 7, 2006
(Under 37 CFR 1.47)

(65) Prior Publication Data
US 2006/0289154 A1   Dec. 28, 2006

(51) Int. Cl.
*E21B 33/16* (2006.01)

(52) U.S. Cl. .................... 166/291; 166/177.4

(58) Field of Classification Search ............ 166/285, 166/291, 292, 155, 177.4
See application file for complete search history.

(56) References Cited

U.S. PATENT DOCUMENTS

| 1,704,053 A | 3/1929 | Miller |
| 2,113,647 A | 4/1938 | Davidson et al. |
| RE21,677 E | 12/1940 | Tremolada |
| 3,720,264 A | 3/1973 | Hutchison |
| 3,750,749 A | 8/1973 | Giroux |
| 3,850,241 A | 11/1974 | Hutchinson |
| 4,219,087 A | 8/1980 | Johnson |
| 4,418,947 A | 12/1983 | Talafuse |
| 4,722,389 A | 2/1988 | Arnold |
| 4,854,383 A | 8/1989 | Arnold et al. |
| 4,995,457 A | 2/1991 | Baldridge |
| 5,236,035 A | 8/1993 | Brisco et al. |
| 5,293,933 A | 3/1994 | Brisco |
| 5,443,122 A | 8/1995 | Brisco |
| 5,950,724 A | 9/1999 | Giebeler |

(Continued)

OTHER PUBLICATIONS

Exhibit A—Alexander Oil Tool (set of drawings—7 pages).

*Primary Examiner*—William P Neuder
(74) *Attorney, Agent, or Firm*—Garvey, Smith, Nehrbass & North, L.L.C.; Brett A. North

(57) ABSTRACT

For use with a top drive power unit supported for connection with a well string in a well bore to selectively impart longitudinal and/or rotational movement to the well string, a feeder for supplying a pumpable substance such as cement and the like from an external supply source to the interior of the well string in the well bore without first discharging it through the top drive power unit including a mandrel extending through a sleeve which is sealably and rotatably supported thereon for relative rotation between the sleeve and mandrel. The mandrel and sleeve have flow passages for communicating the pumpable substance from an external source to discharge through the sleeve and mandrel and into the interior of the well string below the top drive power unit. The unit can include a packing injection system, clamp, and novel packing configuration.

17 Claims, 8 Drawing Sheets

U.S. PATENT DOCUMENTS

| | | | |
|---|---|---|---|
| 6,553,825 B1 * | 4/2003 | Boyd | 73/152.59 |
| 7,007,753 B2 * | 3/2006 | Robichaux et al. | 166/291 |
| 2003/0024701 A1 * | 2/2003 | Simson | 166/291 |
| 2004/0035574 A1 | 2/2004 | Pippert | |

* cited by examiner

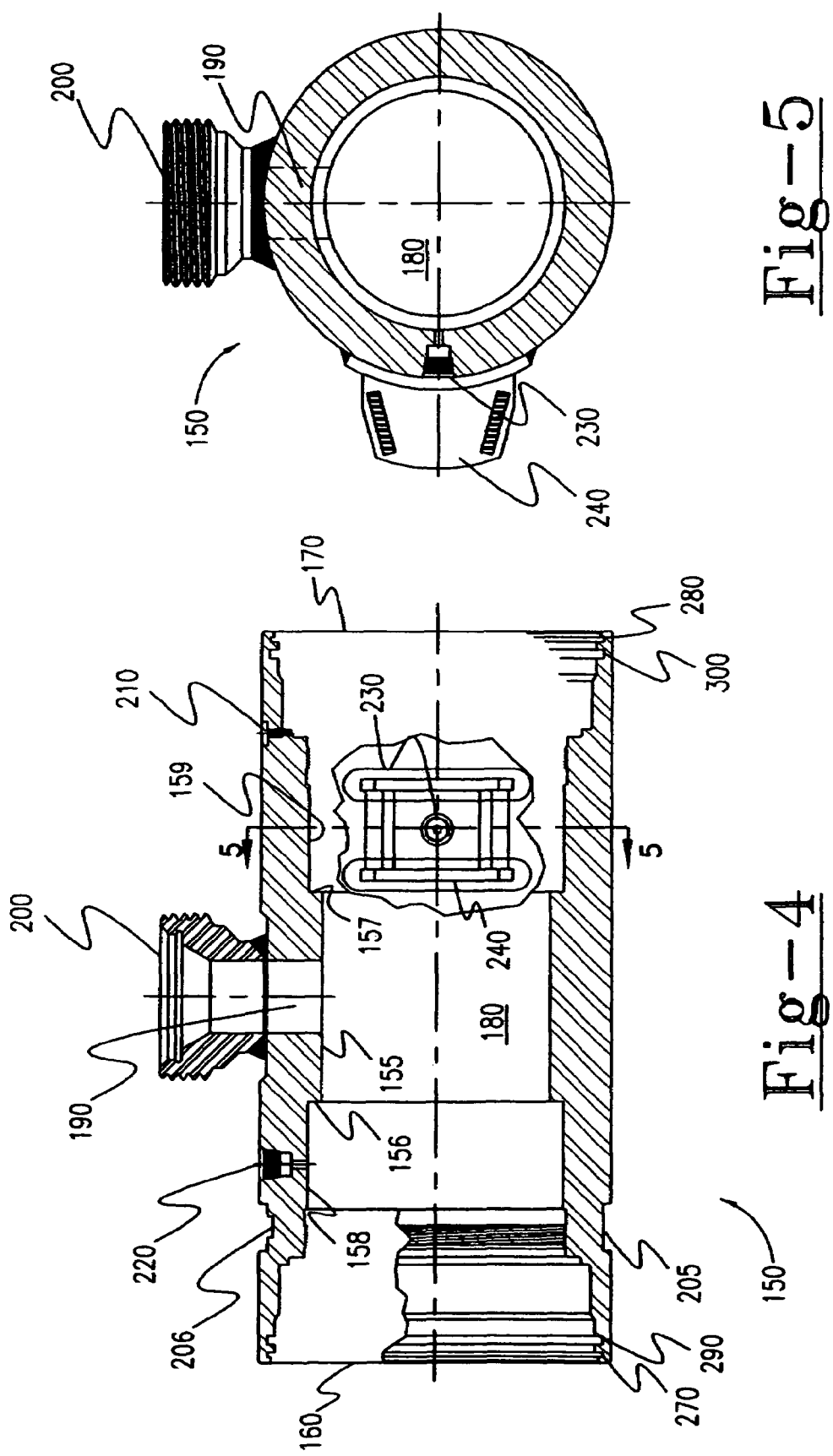

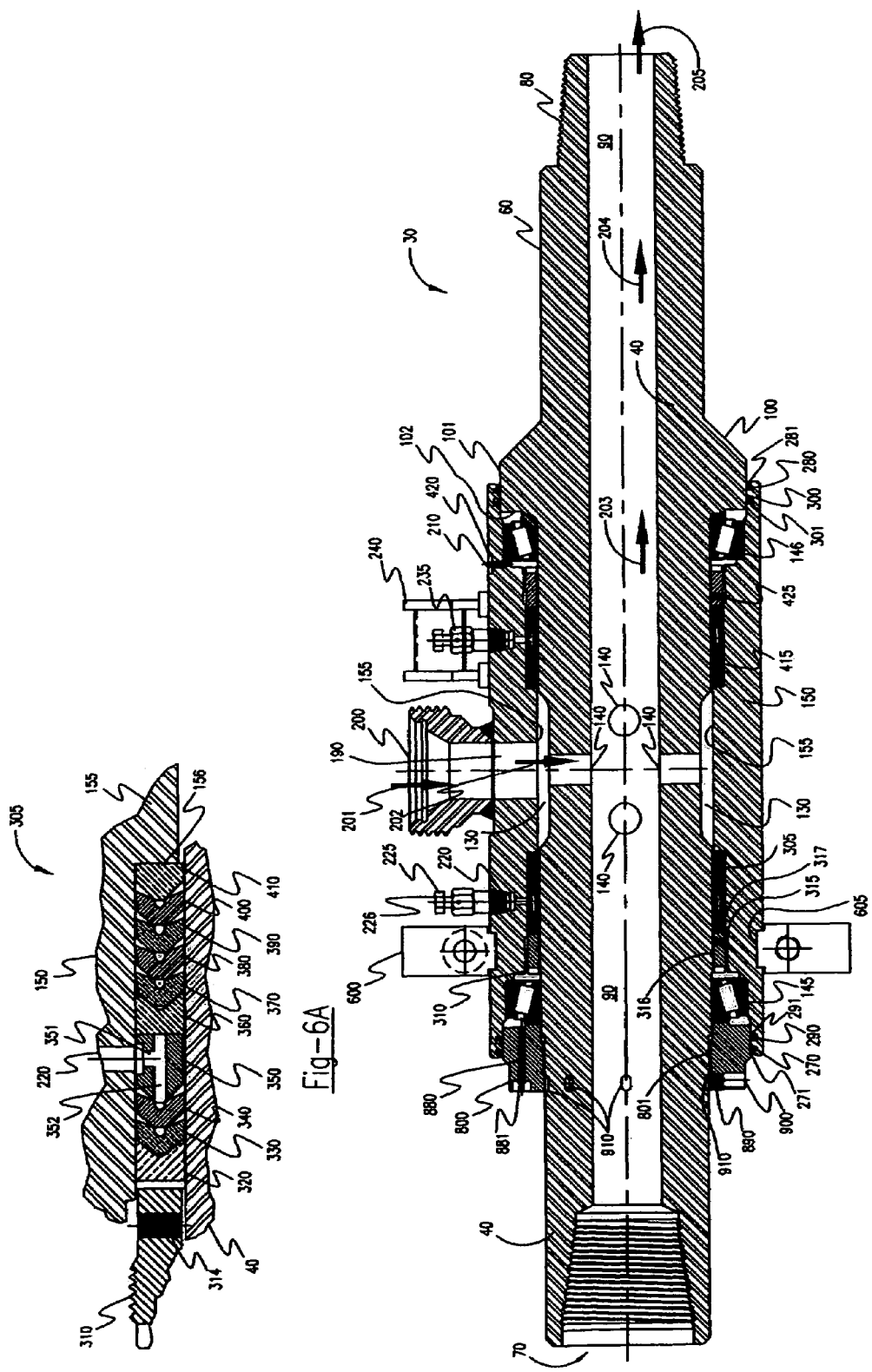

TOP DRIVE SWIVEL APPARATUS AND METHOD

CROSS-REFERENCE TO RELATED APPLICATIONS

Priority of U.S. Provisional Patent Application Ser. No. 60/409,177, filed Sep. 9, 2002, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND

In top drive rigs, the use of a top drive unit, or top drive power unit is employed to rotate drill pipe, or well string in a well bore. Top drive rigs can include spaced guide rails and a drive frame movable along the guide rails and guiding the top drive power unit. The travelling block supports the drive frame through a hook and swivel, and the driving block is used to lower or raise the drive frame along the guide rails. For rotating the drill or well string, the top drive power unit includes a motor connected by gear means with a rotatable member both of which are supported by the drive frame.

During drilling operations, when it is desired to "trip" the drill pipe or well string into or out of the well bore, the drive frame can be lowered or raised. Additionally, during servicing operations, the drill string can be moved longitudinally into or out of the well bore.

The stem of the swivel communicates with the upper end of the rotatable member of the power unit in a manner well known to those skilled in the art for supplying fluid, such as a drilling fluid or mud, through the top drive unit and into the drill or work string. The swivel allows drilling fluid to pass through and be supplied to the drill or well string connected to the lower end of the rotatable member of the top drive power unit as the drill string is rotated and/or moved up and down.

Top drive rigs also can include elevators are secured to and suspended from the frame, the elevators being employed when it is desired to lower joints of drill string into the well bore, or remove such joints from the well bore.

At various times top drive operations, beyond drilling fluid, require various substances to be pumped downhole, such as cement, chemicals, epoxy resins, or the like. In many cases it is desirable to supply such substances at the same time as the top drive unit is rotating and/or moving the drill or well string up and/or down, but bypassing the top drive's power unit so that the substances do not damage/impair the unit. Additionally, it is desirable to supply such substances without interfering with and/or intermittently stopping longitudinal and/or rotational movement by the top drive unit of the drill or well string.

A need exists for a device facilitating insertion of various substances downhole through the drill or well string, bypassing the top drive unit, while at the same time allowing the top drive unit to rotate and/or move the drill or well string.

One example includes cementing a string of well bore casing. In some casing operations it is considered good practice to rotate the string of casing when it is being cemented in the wellbore. Such rotation is believed to facilitate better cement distribution and spread inside the annular space between the casing's exterior and interior of the well bore. In such operations the top drive unit can be used to both support and continuously rotate/intermittently reciprocate the string of casing while cement is pumped down the string's interior. During this time it is desirable to by-pass the top drive unit to avoid possible damage to any of its portions or components.

The following U.S. patents are incorporated herein by reference: U.S. Pat. No. 4,722,389.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

The apparatus of the present invention solves the problems confronted in the art in a simple and straightforward manner. The invention herein broadly relates to an assembly having a top drive arrangement for rotating and longitudinally moving a drill or well string. In one embodiment the present invention includes a swivel apparatus, the swivel generally comprising a mandrel and a sleeve, the swivel being especially useful for top drive rigs.

The sleeve can be rotatably and sealably connected to the mandrel. The swivel can be incorporated into a drill or well string and enabling string sections both above and below the sleeve to be rotated in relation to the sleeve. Additionally, the swivel provides a flow path between the exterior of the sleeve and interior of the mandrel while the drill string is being moved in a longitudinal direction (up or down) and/or being rotated/reciprocated. The interior of the mandrel can be fluidly connected to the longitudinal bore of casing or drill string thus providing a path from the sleeve to the interior of the casing/drill string.

In one embodiment an object of the present invention is to provide a method and apparatus for servicing a well wherein a swivel is connected to and below a top drive unit for conveying pumpable substances from an external supply through the swivel for discharge into the well string, but bypassing the top drive unit.

In another embodiment of the present invention is provided a method of conducting servicing operations in a well bore, such as cementing, comprising the steps of moving a top drive unit longitudinally and/or rotationally to provide longitudinal movement and/or rotation/reciprocation in the well bore of a well string suspended from the top drive unit, rotating the drill or well string and supplying a pumpable substance to the well bore in which the drill or well string is manipulated by introducing the pumpable substance at a point below the top drive power unit and into the well string.

In other embodiments of the present invention a swivel placed below the top drive unit can be used to perform jobs such as spotting pills, squeeze work, open formation integrity work, kill jobs, fishing tool operations with high pressure pumps, sub-sea stack testing, rotation of casing during side tracking, and gravel pack or frack jobs. In still other embodiments a top drive swivel can be used in a method of pumping loss circulation material (LCM) into a well to plug/seal areas of downhole fluid loss to the formation and in high speed milling jobs using cutting tools to address down hole obstructions. In other embodiments the top drive swivel can be used with free point indicators and shot string or cord to free stuck pipe where pumpable substances are pumped downhole at the same time the downhole string/pipe/free point indicator is being rotated and/or-reciprocated. In still other embodiments the top drive swivel can be used for setting hook wall packers and washing sand.

In still other embodiments the top drive swivel can be used for pumping pumpable substances downhole when repairs/servicing is being done to the top drive unit and rotation of the downhole drill string is being accomplished by the rotary table. Such use for rotation and pumping can prevent sticking/seizing of the drill string downhole. In this application safety valves, such as TIW valves, can be placed above and below the top drive swivel to enable routing of fluid flow and to ensure well control.

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 4 is a sectional view of a sleeve which can be incorporated into the top drive swivel of FIG. 2;

FIG. 5 is a right hand side view of the sleeve of FIG. 4;

FIG. 6 is a sectional view of the top drive swivel of FIG. 2;

FIG. 6A is a sectional view of the packing unit shown in FIG. 6;

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
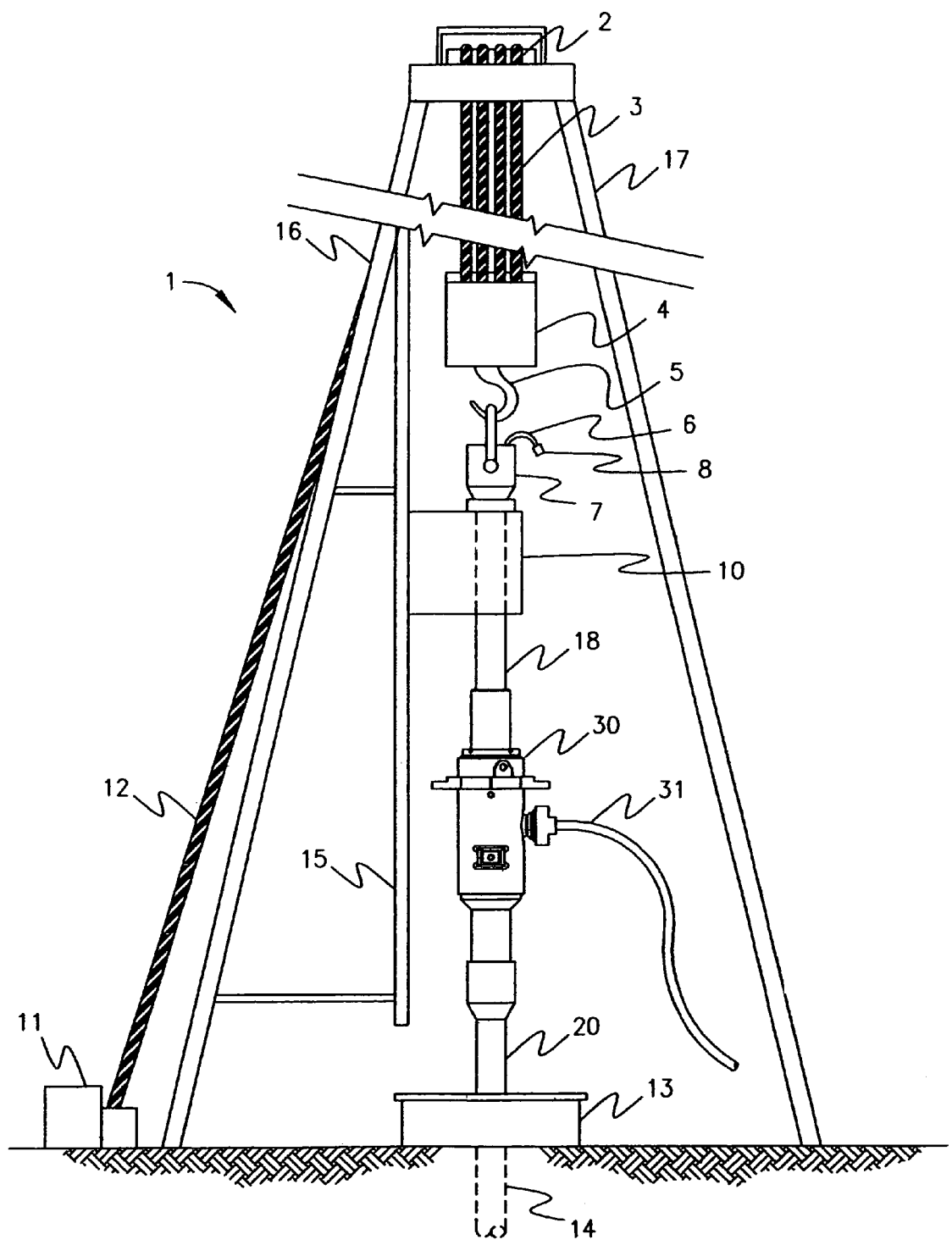
FIG. 1 is a schematic view showing a top drive rig with one embodiment of a top drive swivel incorporated in the drill string.

FIG. 1 is a schematic view showing a top drive rig 1 with one embodiment of a top drive swivel 30 incorporated into drill string 20. FIG. 1 is shows a rig 1 having a top drive unit 10. Rig 5 comprises-supports 16,17; crown block 2; traveling block 4; and hook 5. Draw works 11 uses cable 12 to move up and down traveling block 4, top drive unit 10, and drill string 20. Traveling block 4 supports top drive unit 10. Top drive unit 10 supports drill string 20.

During drilling operations, top drive unit 10 can be used to rotate drill string 20 which enters wellbore 14. Top drive unit 10 can ride along guide rails 15 as unit 10 is moved up and down. Guide rails 15 prevent top drive unit 10 itself from rotating as top drive unit 10 rotates drill string 20. During drilling operations drilling fluid can be supplied downhole through drilling fluid line 8 and gooseneck 6.

At various times top drive operations, beyond drilling fluid, require substances to be pumped downhole, such as cement, chemicals, epoxy resins, or the like. In many cases it is desirable to supply such substances at the same time as top drive unit 10 is rotating and/or moving drill or well string 20 up and/or down and bypassing top drive unit 10 so that the substances do not damage/impair top drive unit 10. Additionally, it is desirable to supply such substances without interfering with and/or intermittently stopping longitudinal and/or rotational movements of drill or well string 20 being moved/rotated by top drive unit 10. This can be accomplished by using top drive swivel 30.

Top drive swivel 30 can be installed between top drive unit 10 and drill string 20. One or more joints of drill pipe 18 can be placed between top drive unit 10 and swivel 30. Additionally, a valve can be placed between top drive swivel 30 and top drive unit 10. Pumpable substances can be pumped through hose 31, swivel 30, and into the interior of drill string 20 thereby bypassing top drive unit 10. Top drive swivel 30 is preferably sized to be connected to drill string 20 such as 4½ inch IF API drill pipe or the size of the drill pipe to which swivel 30 is connected to. However, crossover subs can also be used between top drive swivel 30 and connections to drill string 20.

Figure 2:
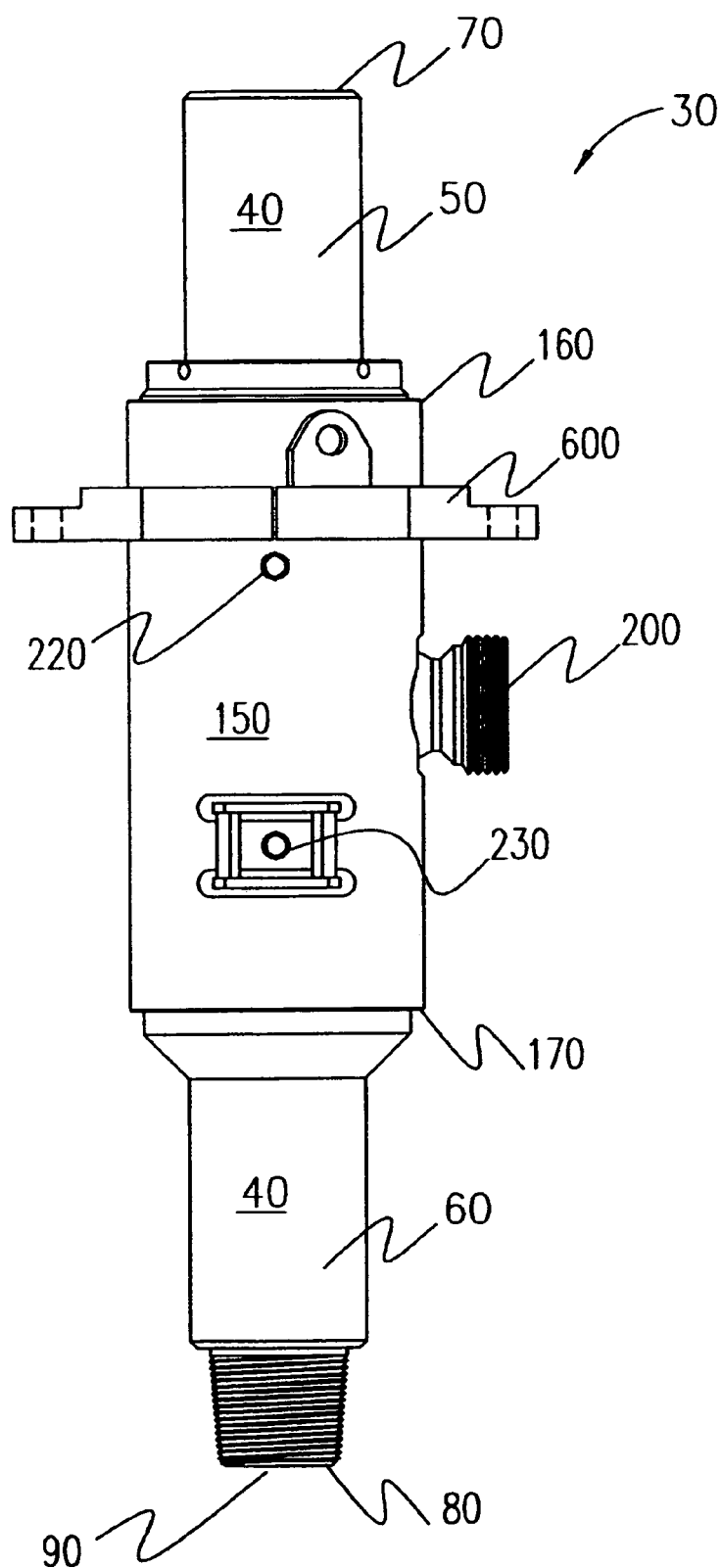
FIG. 2 is a schematic view of one embodiment of a top drive swivel.

FIG. 2 is a schematic view of one embodiment of a top drive swivel 30. Top drive swivel 30 can be comprised of mandrel 40 and sleeve 150. Sleeve 150 is rotatably and sealably connected to mandrel 30. Accordingly, when mandrel 40 is rotated, sleeve 150 can remain stationary to an observer insofar as rotation is concerned. As will be discussed later inlet 200 of sleeve 150 is and remains fluidly connected to a the central longitudinal passage 90 of mandrel 40. Accordingly, while mandrel 40 is being rotated and/or moved up and down pumpable substances can enter inlet 200 and exit central longitudinal passage 90 at lower end 60 of mandrel 40.

Figure 3:
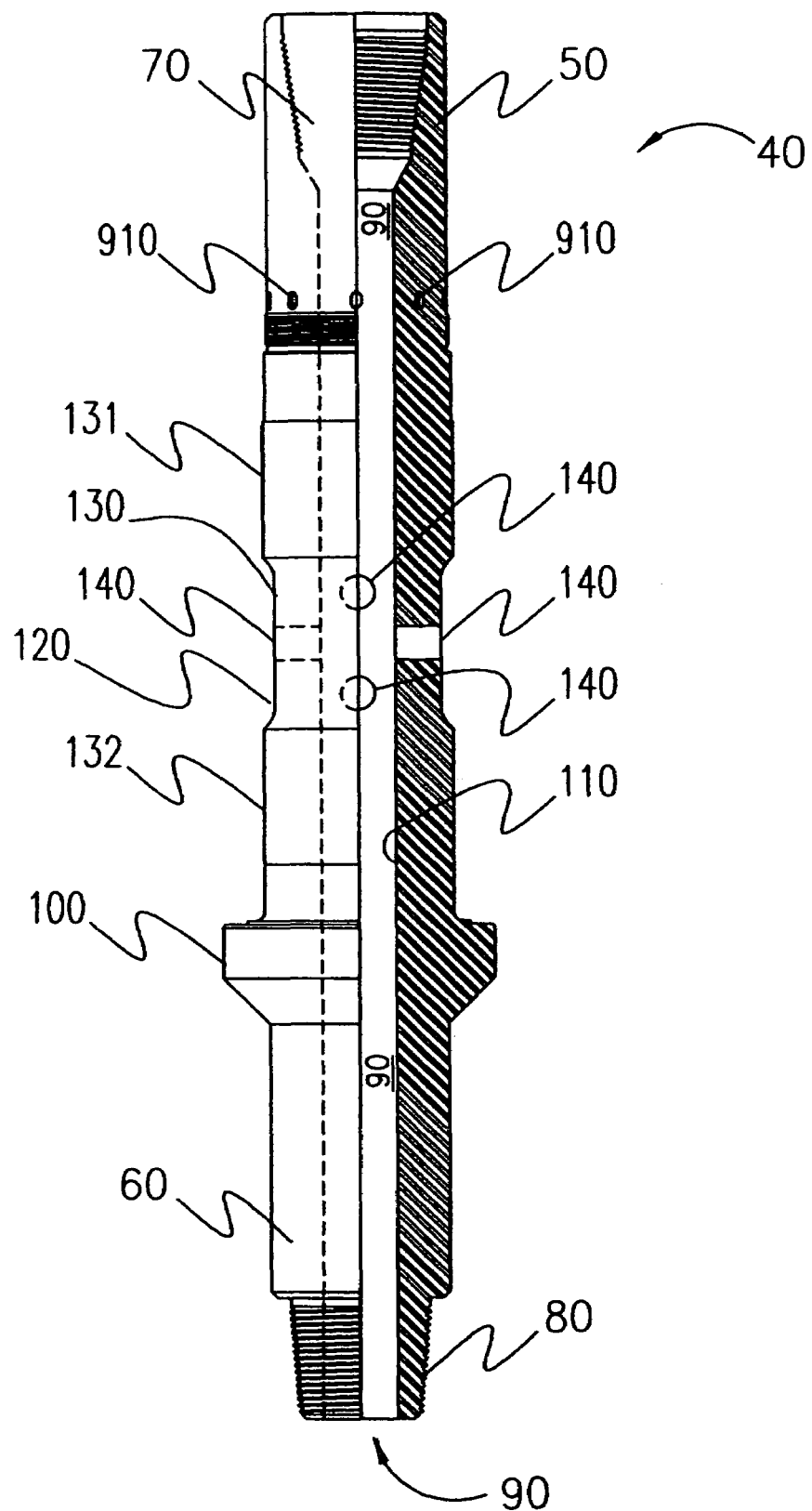
FIG. 3 is a sectional view of a mandrel which can be incorporated in the top drive swivel of FIG. 2.

FIG. 3 is a sectional view of mandrel 40 which can be incorporated in the top drive swivel 30. Mandrel 40 is comprised of upper end 50 and lower end 60. Central longitudinal passage 90 extends from upper end 50 through lower end 60. Lower end 60 can include a pin connection or any other conventional connection. Upper end 50 can include box connection 70 or any other conventional connection. Mandrel 40 can in effect become a part of drill string 20. Sleeve 150 fits over mandrel 40 and becomes rotatably and sealably connected to mandrel 40. Mandrel 40 can include shoulder 100 to supper sleeve 150. Mandrel 40 can include one or more radial inlet ports 140 fluidly connecting central longitudinal passage 90 to recessed area 130. Recessed area 130 preferably forms a circumferential recess along the perimeter of mandrel 40 and between packing support areas 131,132. In such manner recessed area will remain fluidly connected with radial passage 190 and inlet 200 of sleeve 150 (see FIGS. 4, 6).

To reduce friction between mandrel 40 and packing units 305, 415 (FIG. 6) and increase the life expectancy of packing units 305, 415, packing support areas 131, 132 can be coated and/or sprayed welded with a materials of various compositions, such as hard chrome, nickel/chrome or nickel/ aluminum (95 percent nickel and 5 percent aluminum) A material which can be used for coating by spray welding is the chrome alloy TAFA 95MX Ultrahard Wire (Armacor M) manufactured by TAFA Technologies, Inc., 146 Pembroke Road, Concord New Hampshire. TAFA 95 MX is an alloy of the following composition: Chromium 30 percent; Boron 6 percent; Manganese 3 percent; Silicon 3 percent; and Iron balance. The TAFA 95 MX can be combined with a chrome steel. Another material which can be used for coating by spray welding is TAFA BONDARC WIRE—75B manufactured by TAFA Technologies, Inc. TAFA BONDARC WIRE—75B is an alloy containing the following elements: Nickel 94 percent; Aluminum 4.6 percent; Titanium 0.6 percent; Iron 0.4 percent; Manganese 0.3 percent; Cobalt 0.2 percent; Molybdenum 0.1 percent; Copper 0.1 percent; and Chromium 0.1 percent. Another material which can be used for coating by spray welding is the nickel chrome alloy TAFALOY NICKEL-CHROME-MOLY WIRE-71T manufactured by TAFA Technologies, Inc. TAFALOY NICKEL-CHROME-MOLY WIRE-71T is an alloy containing the following elements: Nickel 61.2 percent; Chromium 22 percent; Iron 3 percent; Molybdenum 9 percent; Tantalum 3 percent; and Cobalt 1 percent. Various combinations of the above alloys can also be used for the coating/spray welding. Packing support areas 131, 132 can also be coated by a plating method, such as electroplating. The surface of support areas 131, 132 can be ground/polished/finished to a desired finish to reduce friction and wear between support areas 131, 132 and packing units 305, 415.

FIG. 4 is a sectional view of sleeve 150 which can be incorporated into top drive swivel 30. FIG. 5 is a right hand sectional view of sleeve 150 taken along the lines 4-4. Sleeve 150 can include central longitudinal passage 180 extending from upper end 160 through lower end 170. Sleeve 150 can also include radial passage 190 and inlet 200. Inlet 200 can be attached by welding or any other conventional type method of fastening such as a threaded connection. If welded the connection is preferably heat treated to remove residual stresses created by the welding procedure. Also shown is protruding section 155 along with upper and lower shoulders 156,157. Lubrication port 210 can be included to provide lubrication for interior bearings. Packing ports 220, 230 can also be included to provide the option of injecting packing material into the packing units 305,415 (see FIG. 6). A protective cover 240 can be placed around packing port 230 to protect packing injector 235 (see FIG. 6). Optionally, a second protective cover can be placed around packing port 220, however, it is anticipated that protection will be provided by clamp 600 and inlet 200. Sleeve 150 can include peripheral groove 205 for attachment of clamp 600. Additionally, key way 206 can be provided for insertion of a key 700. FIG. 5 illustrates how central longitudinal passage 180 is fluidly connected to inlet 200 through radial passage 190. It is preferred that welding be performed using Preferred Industries Welding Procedure number T3, 1550REV-A 4140HT (285/311 bhn) RMT to 4140 HT (285/311 bhn (RMT) It is also preferred that welds be X-ray tested, magnetic particle tested, and stress relieved.

FIG. 6 is a sectional view of the assembled top drive swivel 30 of FIG. 2. As can be seen sleeve 150 slides over mandrel 40. Bearings 145, 146 rotatably connect sleeve 150 to mandrel 40. Bearings 145, 146 are preferably thrust bearings although many conventionally available bearing will adequately function, including conical and ball bearings. Packing units 305, 415 sealingly connect sleeve 150 to mandrel 40. Inlet 200 of sleeve 150 is and remains fluidly connected to central longitudinal passage 90 of mandrel 40. Accordingly, while mandrel 40 is being rotated and/or moved up and down pumpable substances can enter inlet 200 and exit central longitudinal passage 90 at lower end 60 of mandrel 40. Recessed area 130 and protruding section 155 form a peripheral recess between mandrel 40 and sleeve 150. The fluid pathway from inlet 200 to outlet at lower end 60 of central longitudinal passage 90 is as follows: entering inlet 200 (arrow 201); passing through radial passage 190 (arrow 202); passing through recessed area 130 (arrow 202); passing through one of the plurality of radial inlet ports 140 (arrow 202), passing through central longitudinal passage 90 (arrow 203); and exiting mandrel 40 via lower end 60 at pin connection 80 (arrows 204, 205).

FIG. 6A shows a blown up schematic view of packing unit 305. Packing unit 305 can comprise packing end 320; packing ring 330, packing ring 340, packing lubrication ring 350, packing end 360, packing ring 370, packing ring 380, packing ring 390, packing ring 400, and packing end 410. Packing unit 305 sealing connects mandrel 40 and sleeve 150. Packing unit 305 can be encased by packing retainer nut 310 and shoulder 156 of protruding section 155. Packing retainer nut 310 can be a ring which threadably engages sleeve 150 at threaded area 316. Packing retainer nut 310 and shoulder 156 squeeze packing unit 305 to obtain a good seal between mandrel 40 and sleeve 150. Set screw 315 can be used to lock packing retainer nut 310 in place and prevent retainer nut 310 from loosening during operation. Set screw 315 can be threaded into bore 314 and lock into receiving area 317 on sleeve 150. Packing unit 415 can be constructed substantially similar to packing unit 305. The materials for packing unit 305 and packing unit 415 can be similar.

Packing end 320 is preferably a bronze female packing end. Packing ring 330 is preferably a "Vee" packing ring— Teflon such as that supplied by CDI part number 0500700-VS-720 Carbon Reflon (having 2 percent carbon). Packing ring 340 is preferably a "Vee" packing ring—Rubber such as that supplied by CDI part number 0500700-VS-850NBR Aramid. Packing lubrication ring 350 is described below in the discussion regarding FIGS. 6B and 6C. Packing end 360 preferably a bronze female packing end. Packing ring 370 is preferably a "Vee" packing ring—Teflon such as that supplied by CDI part number 0500700-VS-720 Carbon Reflon (having 2 percent carbon). Packing ring 380 is preferably a "Vee" packing ring—Rubber such as that supplied by CDI part number 0500700-VS-850NBR Aramid. Packing ring 390 is preferably a "Vee" packing ring—Teflon such as that supplied by CDI part number 0500700-VS-720 Carbon Reflon (having 2 percent carbon). Packing ring 400 is preferably a "Vee" packing ring—Rubber such as that supplied by CDI part number 0500700-VS-850NBR Aramid. Packing end 410 is preferably a bronze male packing ring. Various alternative materials for packing rings can be used such as standard chevron packing rings of standard packing materials. Bronze rings preferably meet or exceed an SAE 660 standard.

Figure 9:
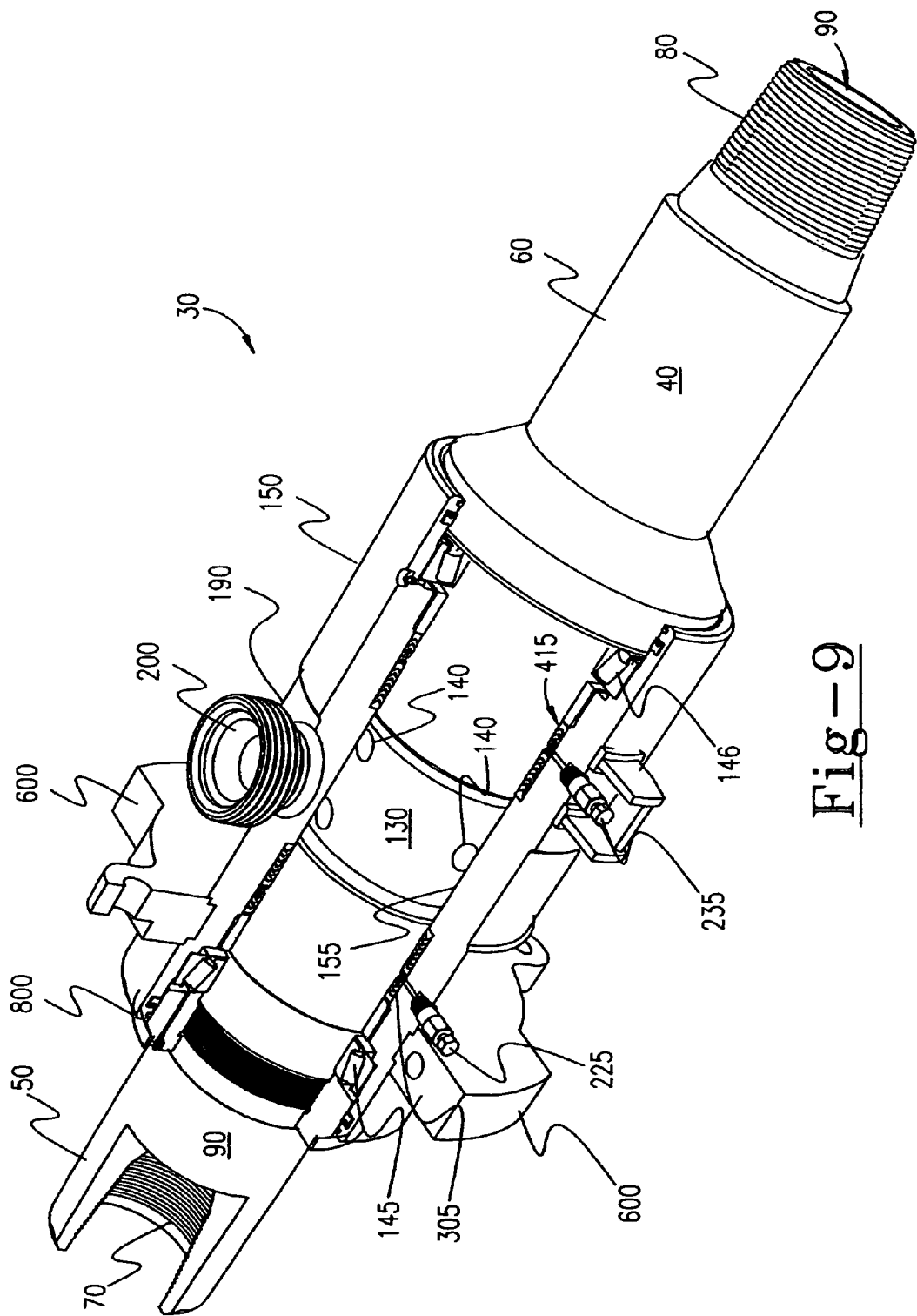
FIG. 9 is a perspective view and partial sectional view of the top drive swivel shown in FIG. 2.

A packing injection option can be provided for top drive swivel 30. Injection fitting 225 can be used to inject additional packing material such as teflon into packing unit 305. Head 226 for injection fitting 225 can be removed and packing material can then be inserting into fitting 225. Head 226 can then be screwed back into injection fitting 225 which would push packing material through fitting 225 and into packing port 220. The material would then be pushed into packing ring 350. Packing ring 350 can comprise radial port 352 and transverse port 351. The material would proceed through radial port 352 and exit through transverse port 351. The material would tend to push out and squeeze packing rings 340, 330, 320 and packing rings 360, 370, 380, 390, 400 tending to create a better seal between packing unit 305 with mandrel 40 and sleeve 150. The interaction between injection fitting 235 and packing unit 415 can be substantially similar to the interaction between injection fitting 225 and packing unit 305. A conventionally available material which can be used for packing injection fittings 225, 235 is DESCO™ 625 Pak part number 6242-12 in the form of a 1 inch by ⅜ inch stick and distributed by Chemola Division of South Coast Products, Inc., Houston, Tex. In FIG. 6, injection fitting 235 is shown ninety degrees out of phase and, is preferably located as shown in FIG. 9.

Injection fittings 225, 235 have a dual purpose: (a) provide an operator a visual indication whether there has been any leakage past either packing units 305, 415 and (b) allow the operator to easily inject additional packing material and stop seal leakage without removing top drive swivel 30 from drill string 20.

Figure 6C:
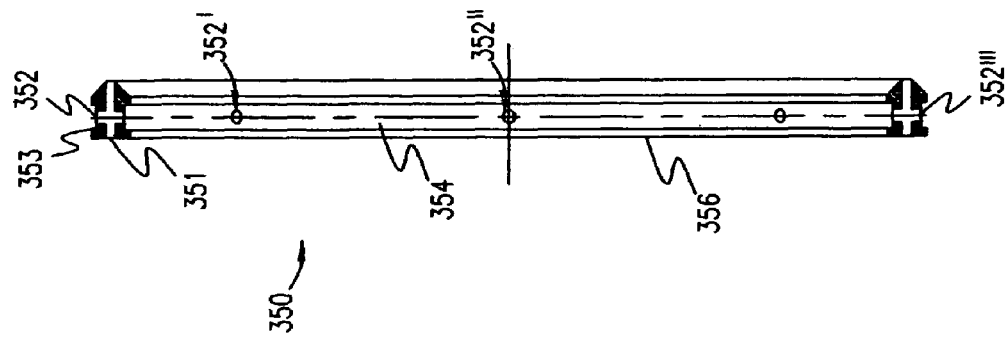
FIG. 6C is a side view section of the packing injection ring shown in FIG. 6B.
Figure 6B:
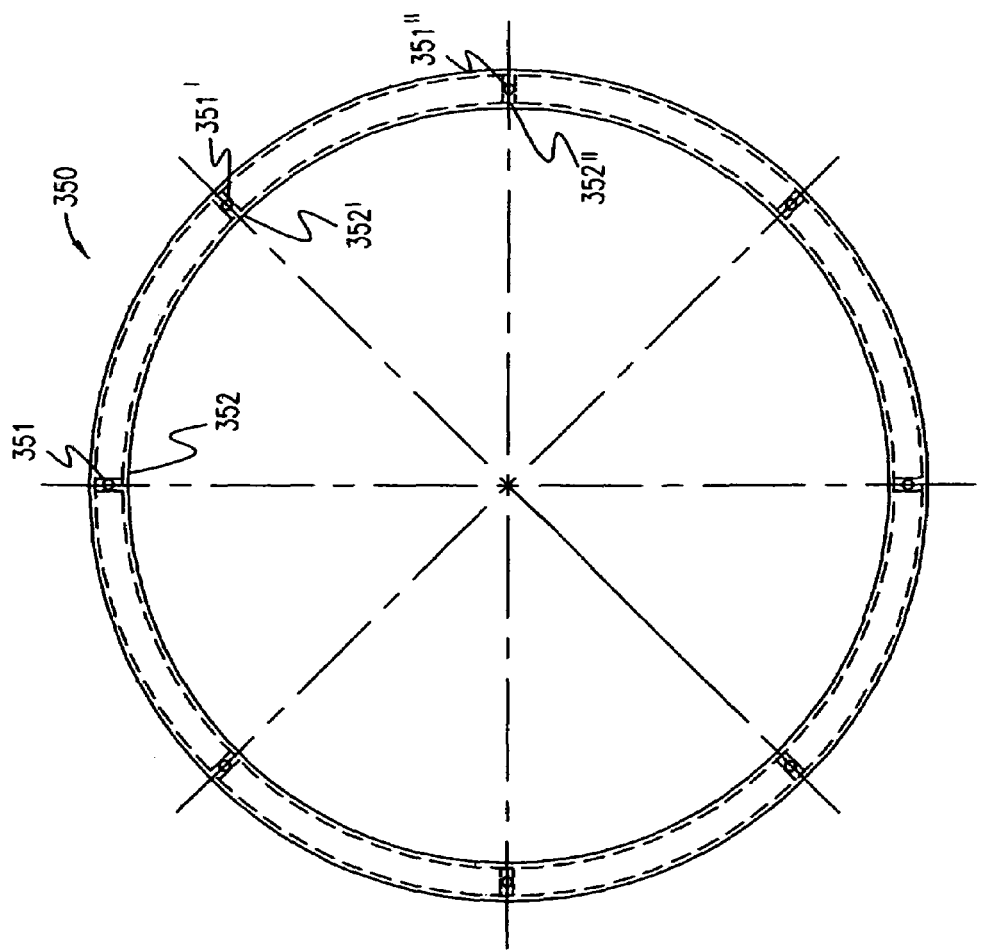
FIG. 6B is a top view of the packing injection ring shown in FIGS. 6 and 6A.

FIGS. 6B and 6C shows top and side views of packing injection ring 350. Packing injection ring 350 includes a male end 355 at its top and a flat end 356 at its rear. Ring 350 includes peripheral groove 353 around its perimeter. Optionally, ring 350 can include interior groove along its interior. A plurality of transverse ports 351, 351', 351", 351'", etc. extending from male end 355 to flat end 356 can be included and can be evenly spaced along the circumference of ring 350. A plurality of radial ports 352, 352', 352", 352'", etc. can be included extending from peripheral groove 353 and respectively intersecting transverse ports 351, 351', 351", 351'", etc. Preferably, the radial ports can extend from peripheral groove 353 through interior groove 354.

Retainer nut 800 can be used to maintain sleeve 150 on mandrel 40. Retainer nut 800 can threadably engage mandrel 40 at threaded area 801. Set screw 890 can be used to lock in place retainer nut 800 and prevent nut 800 from loosening during operation. Set screw 890 threadably engages retainer nut 800 through bore 900 and sets in one of a plurality of receiving portions 910 formed in mandrel 40. Retaining nut 800 can also include grease injection fitting 880 for lubricating bearing 145. Wiper ring 271 set in area 270 protects against dirt and other items from entering between the sleeve 150 and mandrel 40. Grease ring 291 set in area 290 holds in lubricant for bearing 145.

Bearing 146 can be lubricated through grease injection fitting 211 and lubrication port 210. Bearing 145 can be lubricated through grease injection fitting 881 and lubrication port 880.

Figure 8:
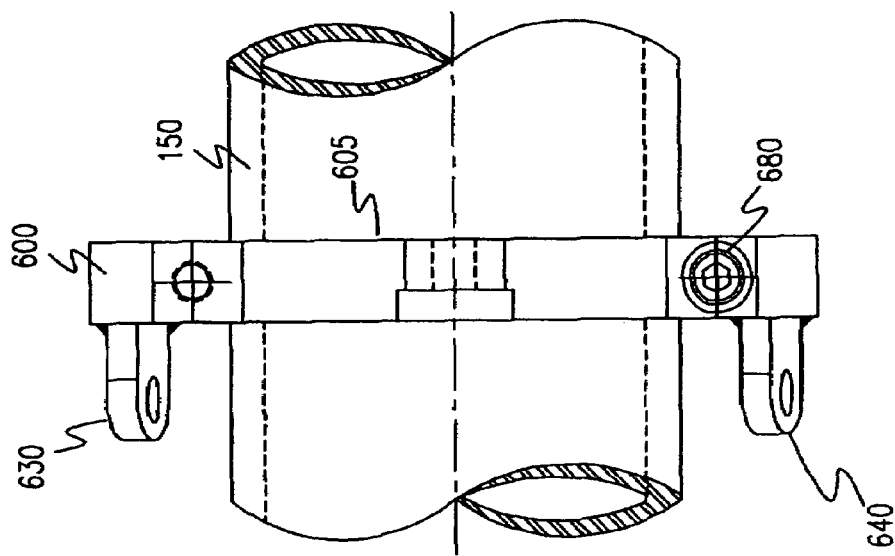
FIG. 8 is a side view of the clamp of FIG. 7.
Figure 7:
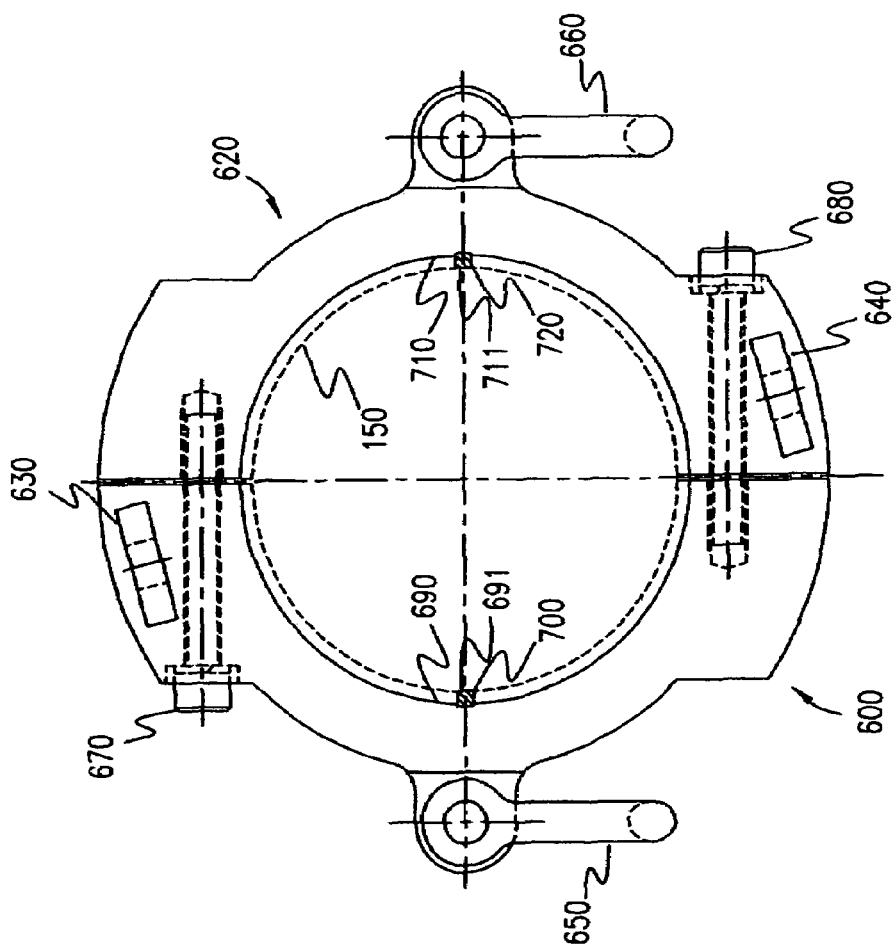
FIG. 7 is a top view of a clamp which can be incorporated into the top drive swivel of FIG. 2.

FIG. 7 is a top view of clamp 600 which can be incorporated into top drive swivel 30. FIG. 8 is a side view of clamp 600. Clamp 600 comprises first portion 610 and second portion 620. First and second portions 610, 620 can be removably attached by fasteners 670, 680. Clamp 600 fits in groove 605 of sleeve 150 (FIG. 6). Key 700 can be included in keyway 690. A corresponding keyway 691 is included in sleeve 150 of top drive swivel 30. Keyways 690, 691 and key 700 prevent clamp 600 from rotating relative to sleeve 150. A second key 720 can be installed in keyways 710, 711. Shackles 650, 660 can be attached to clamp 600 to facilitate handing top drive swivel 30 when clamp 600 is attached. Torque arms 630, 640 can be included to allow attachment of clamp 600 (and sleeve 150) to a stationary part of top drive rig 1 and prevent sleeve 150 from rotating while drill string 20 is being rotated by top drive 10 (and top drive swivel 30 is installed in drill string 20). Torque arms 630, 640 are provided with holes for attaching restraining shackles. Restrained torque arms 630, 640 prevent sleeve 150 from rotating while mandrel 40 is being spun. Otherwise, frictional forces between packing units 305, 415 and packing support areas 131, 135 of rotating mandrel 40 would tend to also rotate sleeve 150. Clamp 600 is preferably fabricated from 4140 heat treated steel being machined to fit around sleeve 150.

FIG. 9 is an overall perspective view (and partial sectional view) of top drive swivel 30. Sleeve 150 is shown rotatably connected to mandrel 40. Bearings 145, 146 allow sleeve 150 to rotate in relation to mandrel 40. Packing units 305, 415 sealingly connect sleeve 150 to mandrel 40. Retaining nut 800 retains sleeve 150 on mandrel 40. Inlet 200 of sleeve 150 is fluidly connected to central longitudinal passage 90 of mandrel 40. Accordingly, while mandrel 40 is being rotated and/or moved up and down pumpable substances can enter inlet 200 and exit central longitudinal passage 90 at lower end 60 of mandrel 40. Recessed area 130 and protruding section 155 form a peripheral recess between mandrel 40 and sleeve 150. The fluid pathway from inlet 200 to outlet at lower end 60 of central longitudinal passage 90 is as follows: entering inlet 200; passing through radial passage 190; passing through recessed area 130; passing through one of the plurality of radial inlet ports 40; passing through central longitudinal passage 90; and exiting mandrel 40 through central longitudinal passage 90 at lower end 60 and pin connection 80. In FIG. 9, injection fitting 225 is shown ninety degrees out of phase and, for protection, is preferably located between inlet 200 and clamp 600.

Mandrel 40 takes substantially all of the structural load from drill string 20. The overall length of mandrel 40 is preferably 52 and 5/16 inches. Mandrel 40 can be machined from a single continuous piece of heat treated steel bar stock. NC50 is preferably the API Tool Joint Designation for the box connection 70 and pin connection 80. Such tool joint designation is equivalent to and interchangeable with 4½ inch IF (Internally Flush), 5 inch XH (Extra Hole) and 5½ inch DSL (Double Stream Line) connections. Additionally, it is preferred that the box connection 70 and pin connection 80 meet the requirements of API specifications 7 and 7G for new rotary shouldered tool joint connections having 6⅝ inch outer diameter and a 2¾ inch inner diameter. The Strength and Design Formulas of API 7G—Appendix A provides the following load carrying specification for mandrel 40 of top drive swivel 30: (a) 1,477 pounds tensile load at the minimum yield stress; (b) 62,000 foot-pounds torsion load at the minimum torsional yield stress; and (c) 37,200 foot-pounds recommended minimum make up torque. Mandrel 40 can be machined from 4340 heat treated bar stock.

Sleeve 150 is preferably fabricated from 4140 heat treated round mechanical tubing having the following properties: (120,000 psi minimum tensile strength, 100,000 psi minimum yield strength, and 285/311 Brinell Hardness Range). The external diameter of sleeve 150 is preferably about 11 inches. Sleeve 150 preferably resists high internal pressures of fluid passing through inlet 200. Preferably top drive swivel 30 with sleeve 150 will withstand a hydrostatic pressure test of 12,500 psi. At this pressure the stress induced in sleeve 150 is preferably only about 24.8 percent of its material's yield strength. At a preferable working pressure of 7,500 psi, there is preferably a 6.7:1 structural safety factor for sleeve 150.

To minimize flow restrictions through top drive swivel 30, large open areas are preferred. Preferably each area of interest throughout top drive swivel 30 is larger than the inlet service port area 200. Inlet 200 is preferably 3 inches having a flow area of 4.19 square inches. The flow area of the annular space between sleeve 150 and mandrel 40 is preferably 20.81 square inches. The flow area through the plurality of radial inlet ports 140 is preferably 7.36 square inches. The flow area through central longitudinal bore 90 is preferably 5.94 square inches.

The following is a list of reference numerals:

LIST FOR REFERENCE NUMERALS

| (Part No.) Reference Numeral | (Description) Description |
|---|---|
| 1 | rig |
| 2 | crown block |
| 3 | cable means |
| 4 | travelling block |
| 5 | hook |
| 6 | gooseneck |
| 7 | swivel |
| 8 | drilling fluid line |
| 10 | top drive unit |
| 11 | draw works |
| 12 | cable |
| 13 | rotary table |
| 14 | well bore |
| 15 | guide rail |
| 16 | support |
| 17 | support |
| 18 | drill pipe |
| 19 | drill string |
| 20 | drill string or work string |
| 30 | swivel |
| 31 | hose |
| 40 | swivel mandrel |
| 50 | upper end |
| 60 | lower end |
| 70 | box connection |
| 80 | pin connection |
| 90 | central longitudinal passage |
| 100 | shoulder |
| 101 | outer surface of shoulder |
| 102 | upper surface of shoulder |
| 110 | interior surface |
| 120 | external surface (mandrel) |
| 130 | recessed area |
| 131 | packing support area |
| 132 | packing support area |
| 140 | radial inlet ports (a plurality) |
| 145 | bearing (preferably combination 6.875 inch bearing cone, Timken Part number 67786, and 9.75 inch bearing cup bearing cup, Timken part number 67720) |
| 146 | bearing (preferably combination 7 inch bearing cone, Timken Part number 67791, and 9.75 inch bearing cup bearing cup, Timken part number 67720) |
| 150 | swivel sleeve |
| 155 | protruding section |
| 156 | shoulder |
| 157 | shoulder |
| 158 | packing support area |
| 159 | packing support area |
| 160 | upper end |
| 170 | lower end |
| 180 | central longitudinal passage |
| 190 | radial passage |
| 200 | inlet |
| 201 | arrow |
| 202 | arrow |
| 203 | arrow |
| 204 | arrow |
| 205 | peripheral groove |
| 206 | key way |

-continued

LIST FOR REFERENCE NUMERALS

| (Part No.) Reference Numeral | (Description) Description |
|---|---|
| 210 | lubrication port |
| 211 | grease injection fitting (preferably grease zerk (¼ - 28 td. in. streight, mat.-monel Alemite part number 1966-B) |
| 220 | packing port |
| 225 | injection fitting(preferably packing injection fitting (10,000 psi) Vesta - PGI Manufacturing part number PF10N4-10)(alternatively Pressure ReliefTool for packing injection fitting Vesta - PGI Manufacturing part number PRT - PIF 12–20) |
| 226 | head |
| 230 | packing port |
| 235 | injection fitting (preferably packing injection fitting (10,000 psi) Vesta - PGI Manufacturing part number PF10N4-10)(alternatively Pressure ReliefTool for packing injection fitting Vesta - PGI Manufacturing part number PRT - PIF 12–20) |
| 240 | cover |
| 250 | upper shoulder |
| 260 | lower shoulder |
| 270 | area for wiper ring |
| 271 | wiper ring (preferably Parker part number 959-65) |
| 280 | area for wiper ring |
| 281 | wiper ring (preferably Parker part number 959-65) |
| 290 | area for grease ring |
| 291 | grease ring (preferably Parker part number 2501000 Standard Polypak) |
| 300 | area for grease ring |
| 301 | grease ring (preferably Parker part number 2501000 Standard Polypak) |
| 305 | packing unit |
| 310 | packing retainer nut |
| 314 | bore for set screw |
| 315 | set screw for packing retainer nut |
| 316 | threaded area |
| 317 | set screw for receiving area |
| 320 | packing end |
| 330 | packing ring |
| 340 | packing ring |
| 350 | packing injection ring |
| 351 | transverse port |
| 352 | radial port |
| 353 | peripheral groove |
| 354 | interior groove |
| 355 | male end |
| 356 | flat end |
| 360 | packing end |
| 370 | packing ring |
| 380 | packing ring |
| 390 | packing ring |
| 400 | packing ring |
| 410 | packing end |
| 415 | packing unit |
| 420 | packing retainer nut |
| 425 | set screw for packing retainer nut |
| 430 | packing end |
| 440 | packing ring |
| 450 | packing ring |
| 460 | packing lubrication ring |
| 470 | packing end |
| 480 | packing ring |
| 490 | packing ring |
| 500 | packing ring |
| 510 | packing ring |
| 520 | packing end |
| 600 | clamp |
| 605 | groove |

-continued

LIST FOR REFERENCE NUMERALS

| (Part No.) Reference Numeral | (Description) Description |
|---|---|
| 610 | first portion |
| 620 | second portion |
| 630 | torque arm |
| 640 | torque arm |
| 650 | shackle |
| 660 | shackle |
| 670 | fastener |
| 680 | fastener |
| 690 | keyway |
| 691 | keyway |
| 700 | key |
| 710 | keyway |
| 711 | keyway |
| 720 | key |
| 730 | peripheral groove |
| 800 | retaining nut |
| 801 | threaded area |
| 810 | outer surface |
| 820 | inclined portion |
| 830 | bore |
| 840 | inner surface |
| 850 | threaded portion |
| 860 | upper surface |
| 870 | bottom surface |
| 880 | lubrication port |
| 881 | grease injection fitting (preferably grease zerk (¼ - 28 td. in. streight, mat.-monel Alemite part number 1966-B) |
| 890 | set screw |
| 900 | bore for set screw |
| 910 | receiving portion for set screw |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A top drive swivel insertable into a drill or work string comprising:
(a) a mandrel having upper and lower end sections and connected to and rotatable with upper and lower drill or work string sections, the mandrel including a longitudinal passage forming a continuation of a passage in the drill or work string sections;
(b) a sleeve having a longitudinal sleeve passage, the sleeve being rotatably connected to the mandrel by a pair of longitudinally spaced bearings;
(c) a seal between upper and lower end portions of the mandrel and sleeve, the seal preventing leakage of fluid between the mandrel and sleeve;
(d) the sleeve comprising an inlet port positioned between the spaced bearings; and
(e) the mandrel comprising a plurality of longitudinally spaced apart radial ports in fluid communication with both the inlet port and the longitudinal passage to supply pressurized fluid from the inlet port to the longitudinal passage and in the passage in drill or work string, wherein the mandrel further comprises a shoulder and a retaining nut threadably engaging the mandrel, the shoulder and retaining nut being spaced apart, the sleeve being positioned between the spaced apart shoulder and retaining nut, the retaining nut further comprises a lubrication port; the lubrication port being positioned to lubricate at least one of the spaced bearings.

2. The top drive swivel of claim 1, wherein the mandrel and sleeve further comprise a peripheral recess, the peripheral recess being located between the longitudinally spaced bearings and being in fluid communication with the inlet port and the plurality of spaced apart radial inlet ports.

3. The top drive swivel of claim 1, wherein the seal further comprises a pair of spaced apart packing units; the sleeve further comprises a protruding section in the longitudinal sleeve passage, each of the packing units being located on opposite sides of the protruding section.

4. The top drive swivel of claim 1, wherein the retaining nut further comprises a set screw threadably engaging the retaining nut, and wherein the mandrel further comprises a plurality of receiving portions, the set engaging one of the receiving portions and locking the retainer nut in position on the mandrel.

5. The top drive swivel of claim 1, wherein the plurality of longitudinally spaced apart radial ports are also circumferentially spaced.

6. The top drive swivel of claim 1, wherein the longitudinally spaced bearings comprise roller bearings inclined in relation to a longitudinal axis of the mandrel.

7. The top drive swivel of claim 1, further comprising a packing port being in communication with the seal.

8. A top drive swivel insertable into a drill or work string comprising:
(a) a mandrel having upper and lower end sections and connected to and rotatable with upper and lower drill or work string sections, the mandrel including a longitudinal passage forming a continuation of a passage in the drill or work string sections;
(b) a sleeve having a longitudinal sleeve passage, the sleeve being rotatably connected to the mandrel;
(c) a seal between upper and lower end portions of the mandrel and sleeve, the seal preventing leakage of fluid between the mandrel and sleeve;
(d) the sleeve comprising an inlet port;
(e) the mandrel comprising a plurality of ports in fluid communication with both the inlet port and the longitudinal passage to supply pressurized fluid from the inlet port to the longitudinal passage and in the passage in drill or work string sections; and
(f) a clamp, the clamp being detachably connected to the sleeve.

9. The top drive swivel of claim 8, wherein the sleeve further comprise a peripheral groove, the clamp fitting in the groove, and wherein the clamp comprises first and second portions, the first and second portions being detachably connectable to each other.

10. The top drive swivel of claim 9, wherein the clamp and sleeve further comprise a key, the key fitting between the clamp and sleeve and restricting relative rotational movement between the clamp and sleeve.

11. The top drive swivel of claim 10, wherein the clamp and sleeve further comprise a second key, the second key fitting between the clamp and sleeve.

12. The top drive swivel of claim 9, wherein at least one bolt detachably connects the first and second portions.

13. The top drive swivel of claim 8, wherein the clamp further comprises a plurality of shackles connected to the clamp.

14. The top drive swivel of claim 8, wherein the clamp further comprises at least one torque arm connected to the clamp.

15. The top drive swivel of claim 14, wherein the clamp comprises two torque arms.

16. The top drive swivel of claim 9, wherein the first and second portions of the clamp are each in the shape of a half moon.

17. The top drive swivel of claim 8, wherein the sleeve is rotatably connected to the mandrel by a pair of longitudinally spaced bearings.

* * * * *

UNITED STATES PATENT AND TRADEMARK OFFICE
CERTIFICATE OF CORRECTION

PATENT NO.         : 7,249,632 B2                                     Page 1 of 1
APPLICATION NO. : 11/371168
DATED              : July 31, 2007
INVENTOR(S)        : Kip M Robichaux et al.

It is certified that error appears in the above-identified patent and that said Letters Patent is hereby corrected as shown below:

On the first page of U.S. Patent No. 7,249,632, please insert:
-- Related U.S. Application Data
(63) Continuation of application No. 10/658,092, filed on Sept. 9, 2003, now Pat. No. 7,007,753

(60) Provisional Application No. 60/409,177, filed on Sept. 9, 2002. --

Signed and Sealed this

Fourth Day of September, 2007

JON W. DUDAS
*Director of the United States Patent and Trademark Office*